US010563510B2

(12) United States Patent
Roberts et al.

(10) Patent No.: US 10,563,510 B2
(45) Date of Patent: Feb. 18, 2020

(54) SYSTEM AND METHOD FOR IN SITU REPAIR OF GAS TURBINE ENGINES

(71) Applicant: General Electric Company, Schenectady, NY (US)

(72) Inventors: Herbert Chidsey Roberts, Middletown, OH (US); David Scott Diwinsky, West Chester, PA (US); Brian David Church, Liberty Township, OH (US); Michael Todd Stowe, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 15/073,796

(22) Filed: Mar. 18, 2016

(65) Prior Publication Data

US 2017/0268342 A1    Sep. 21, 2017

(51) Int. Cl.
| | | |
|---|---|---|
| *F01D 5/00* | (2006.01) |
| *B23K 9/235* | (2006.01) |
| *B23K 9/167* | (2006.01) |
| *B23K 9/04* | (2006.01) |
| *B23K 9/173* | (2006.01) |
| *B23K 9/32* | (2006.01) |
| *B23P 6/00* | (2006.01) |
| *B23K 101/00* | (2006.01) |
| *B23K 103/18* | (2006.01) |
| *B64F 5/40* | (2017.01) |

(52) U.S. Cl.
CPC .............. *F01D 5/005* (2013.01); *B23K 9/044* (2013.01); *B23K 9/167* (2013.01); *B23K 9/173* (2013.01); *B23K 9/235* (2013.01); *B23K 9/321* (2013.01); *B23K 2101/001* (2018.08); *B23K 2103/26* (2018.08); *B23P 6/007* (2013.01); *B64F 5/40* (2017.01); *F05D 2230/232* (2013.01); *F05D 2230/80* (2013.01); *F05D 2240/50* (2013.01)

(58) Field of Classification Search
CPC .. F01D 5/005; B23P 6/00; B23P 6/002; B23P 6/007; F05D 2240/50; F05D 2230/232; F05D 2230/80; B23K 9/235
See application file for complete search history.

(56) References Cited

U.S. PATENT DOCUMENTS

| | | | |
|---|---|---|---|
| 5,089,682 A | 2/1992 | Davies | |
| 5,178,143 A * | 1/1993 | Kwak | A61B 5/04087 252/500 |
| 5,638,993 A * | 6/1997 | Hing | B23Q 11/1084 184/28 |
| 7,000,303 B2 | 2/2006 | Talwar | |

(Continued)

FOREIGN PATENT DOCUMENTS

| | | |
|---|---|---|
| CN | 202019123 U | 10/2011 |
| DE | 102009019885 A1 | 11/2010 |

*Primary Examiner* — Moshe Wilensky
(74) *Attorney, Agent, or Firm* — Dority & Manning, P.A.

(57) ABSTRACT

The present disclosure is directed to a system and method for preventing damage to one or more components of the gas turbine engine during a repair procedure. The method includes locating one or more gaps of one or more components of the gas turbine engine in the vicinity of the defect. Further, the method includes filling the one or more gaps with a filler material so as to prevent arcing over the gaps during repair. Thus, the method also includes applying an electrical discharge to the defect.

13 Claims, 5 Drawing Sheets

(56) References Cited

U.S. PATENT DOCUMENTS

| | | |
|---|---|---|
| 7,223,465 B2 | 5/2007 | Subramanian |
| 7,449,658 B2 | 11/2008 | Mielke |
| 7,832,324 B2 | 11/2010 | Green |
| 8,028,414 B2 | 10/2011 | Gratton |
| 8,247,062 B2 | 8/2012 | Morrison |
| 8,624,147 B2 | 1/2014 | Sassatelli |
| 9,021,675 B2 | 5/2015 | Rose |
| 2005/0235493 A1* | 10/2005 | Philip ............... C23C 4/02 29/889.1 |
| 2013/0199040 A1* | 8/2013 | Dudeck ............ B23P 6/002 29/889.1 |
| 2015/0209915 A1* | 7/2015 | Rautenberg ........ B23P 6/002 29/888.021 |
| 2017/0326685 A1* | 11/2017 | Kell ............... B23K 26/211 |

* cited by examiner

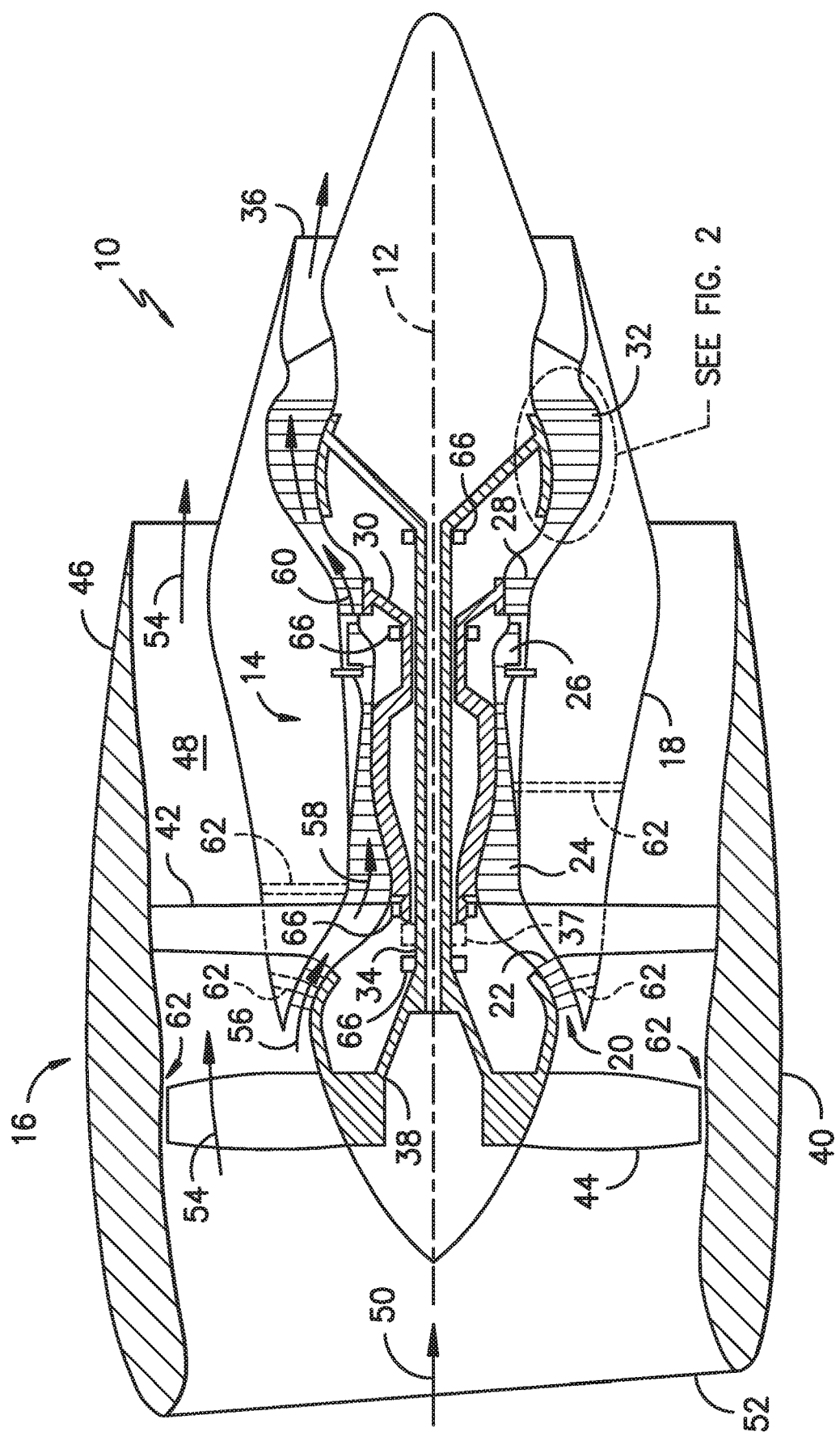
FIG. -1-

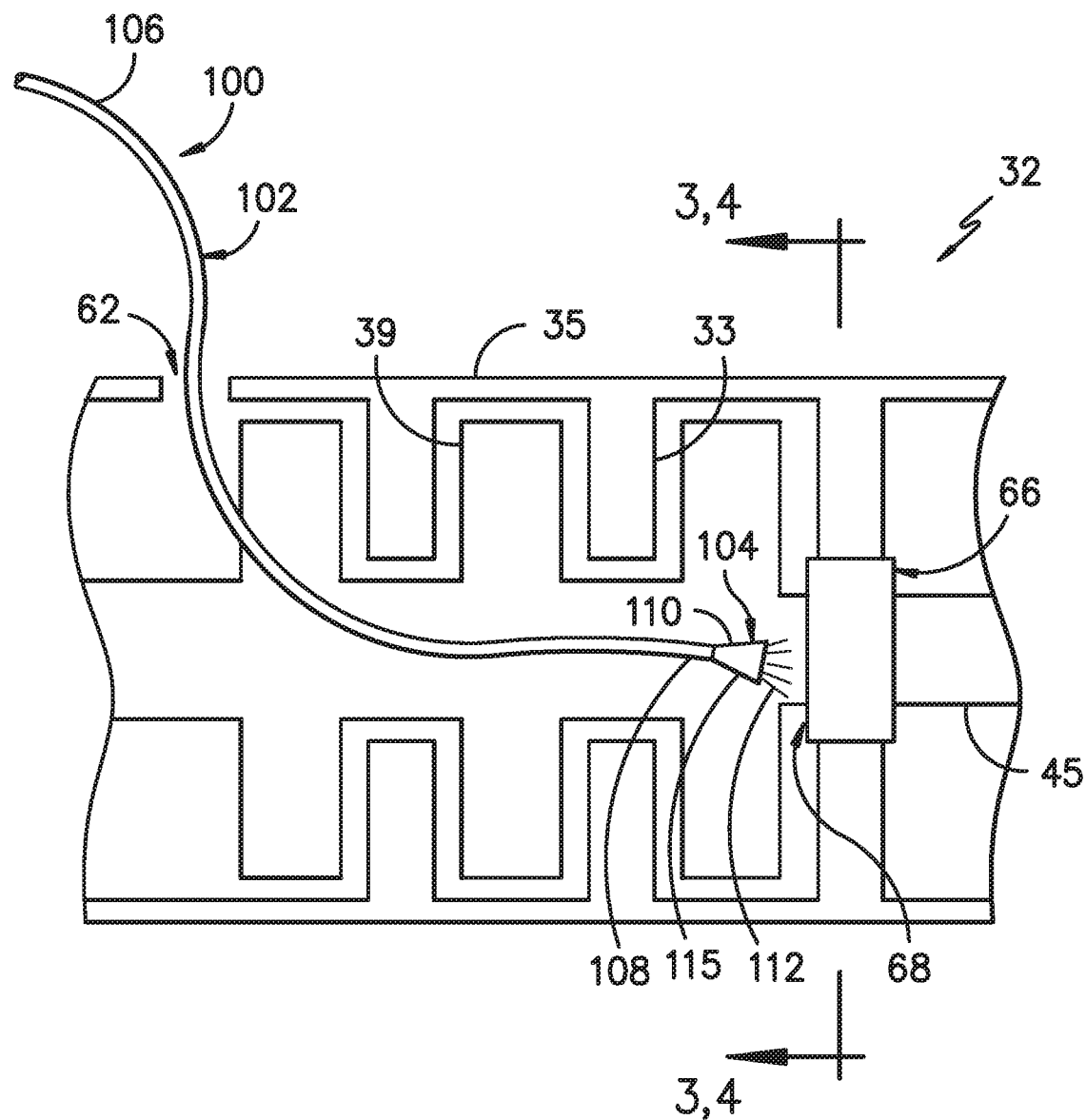
FIG. -2-

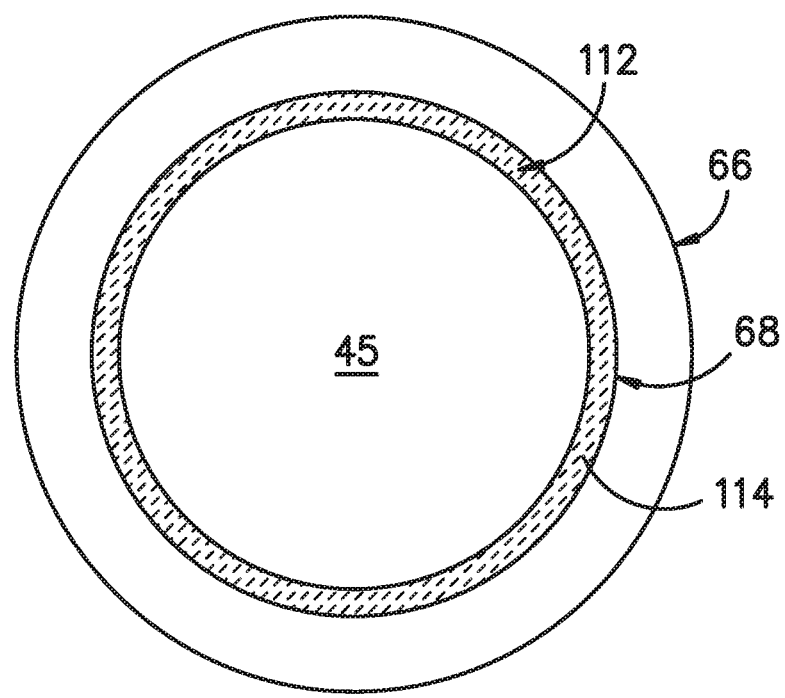
FIG. -3-
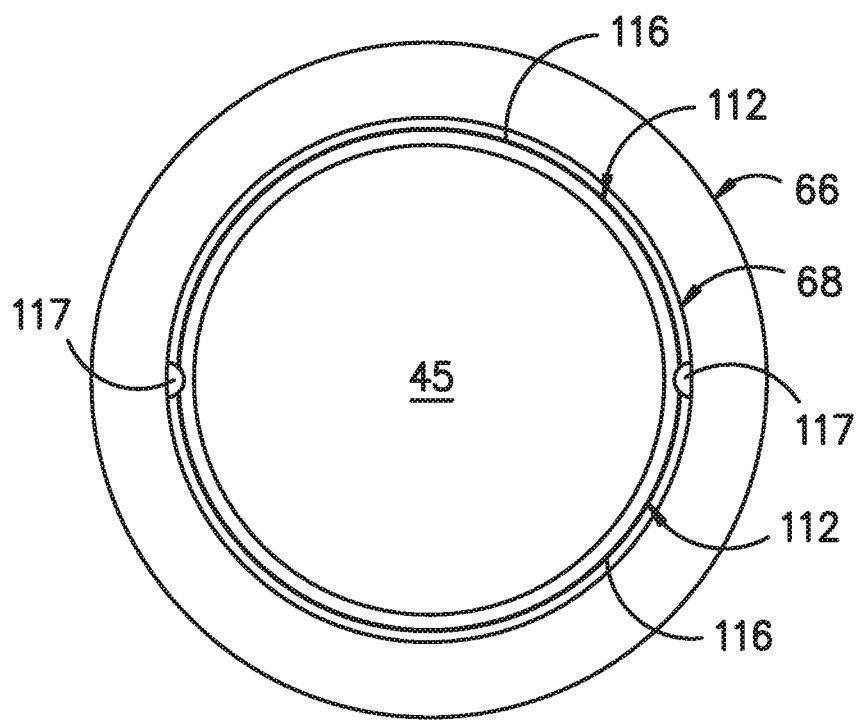
FIG. -4-

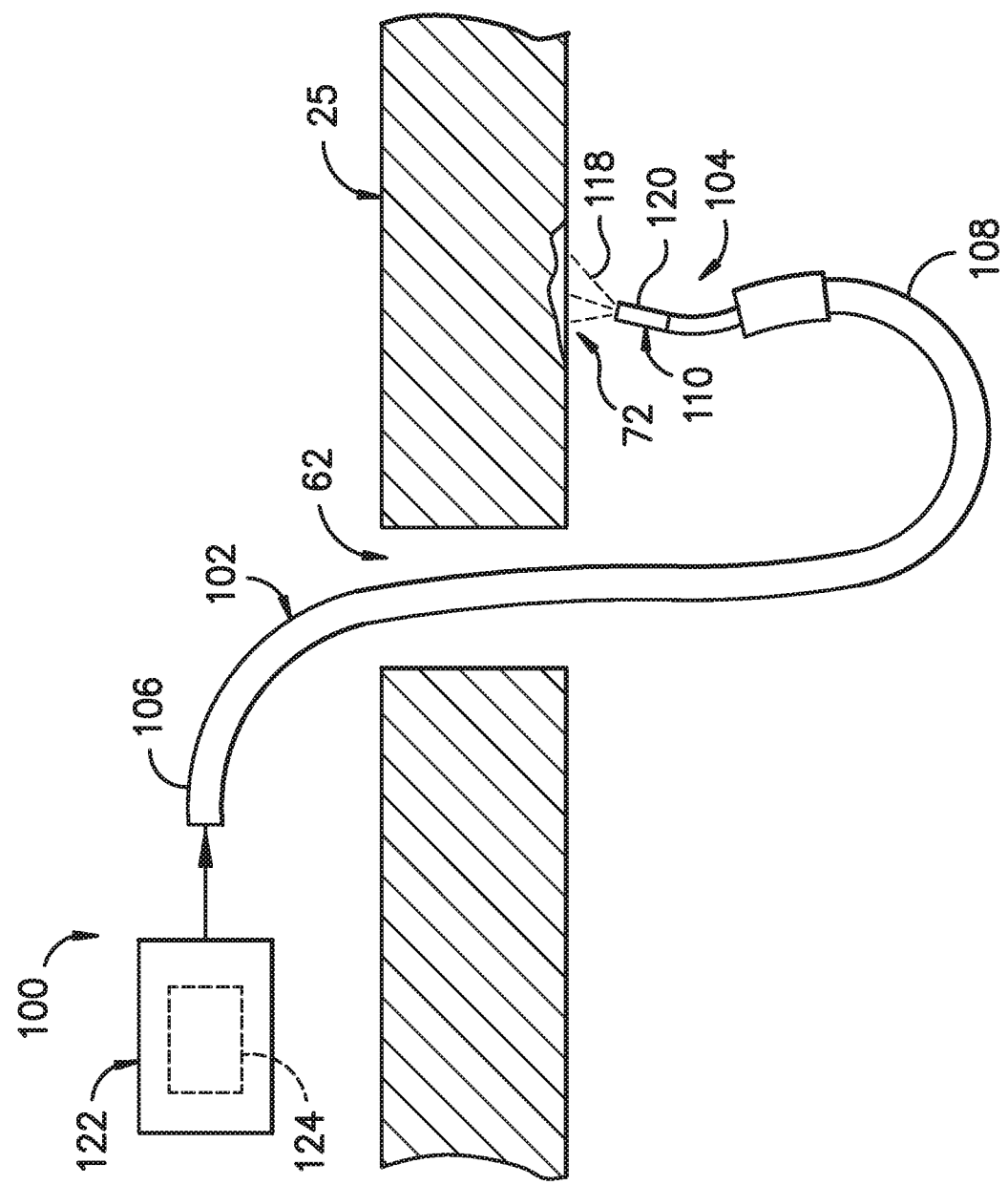
FIG. -5-

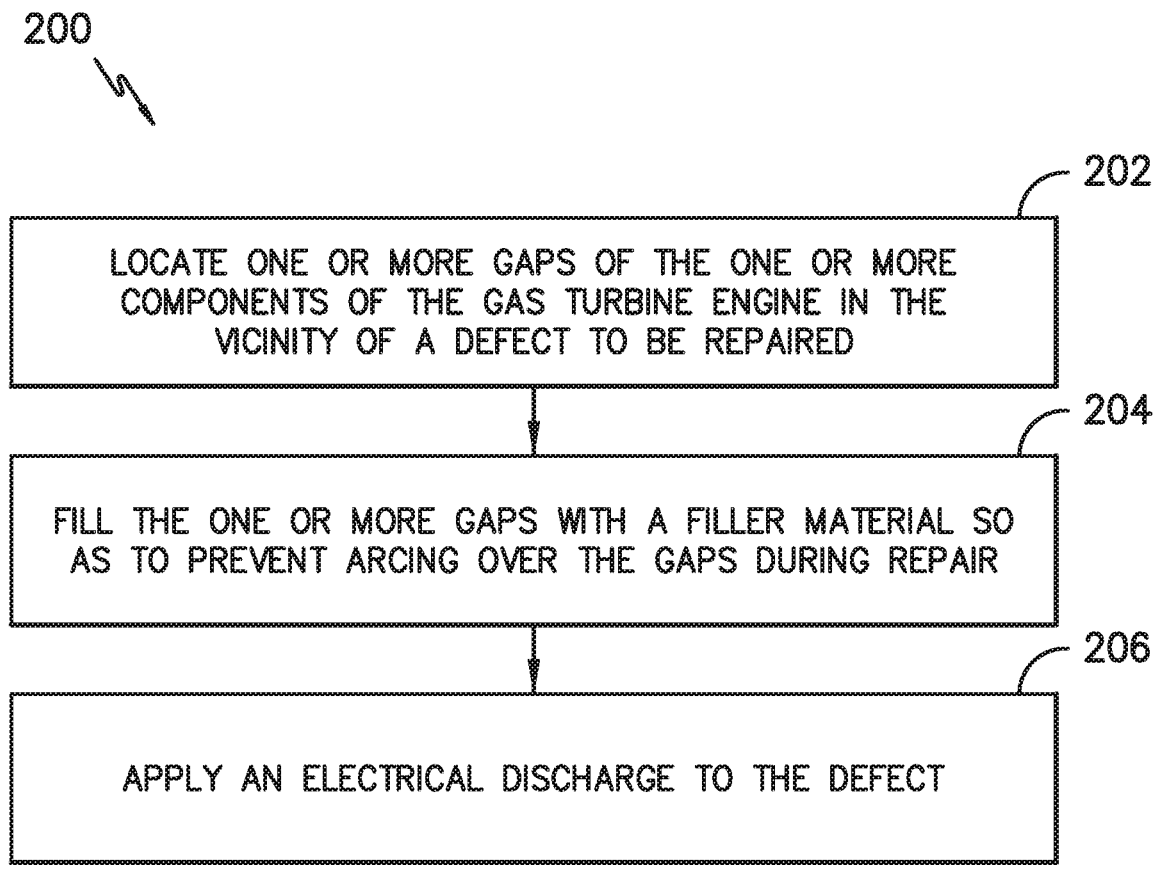
FIG. -6-

SYSTEM AND METHOD FOR IN SITU REPAIR OF GAS TURBINE ENGINES

FIELD OF THE INVENTION

The present invention relates generally to gas turbine engines, and more specifically, to systems and methods for in situ repair of gas turbine turbines.

BACKGROUND OF THE INVENTION

A gas turbine engine generally includes, in serial flow order, a fan section, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as a rotor shaft, rotor disks mounted or otherwise carried by the rotor shaft, turbine blades mounted to and radially extending from the periphery of the disks, and various stationary turbine components such as stator vanes or nozzles, turbine shrouds, and engine frames. The rotatable and stationary turbine components at least partially define the hot gas path through the turbine section. For example, the gas turbine buckets or blades generally have an airfoil shape designed to convert the thermal and kinetic energy of the flow path gases into mechanical rotation of the rotor. As the combustion gases flow through the hot gas path, thermal energy is transferred from the combustion gases to the rotatable and stationary turbine components. Such gas turbine engines are commonly employed on an aircraft.

During operation, various components of the gas turbine engine may need to be repaired and/or replaced. Oftentimes, welding is a useful technique for performing such repairs. When welding or performing other electrical-based repair on-wing, however, an electrical discharge can damage certain features of the turbine engine, e.g. roller or journal bearings, lab seals, or any other features having gaps between components.

Thus, an improved system and method for in situ (i.e. on-wing) repairing of gas turbine engines that addresses the aforementioned issues would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for preventing damage to one or more components of the gas turbine engine during a repair procedure. The method includes locating one or more gaps of the one or more components of the gas turbine engine in the vicinity of a defect to be repaired. The method also includes filling the one or more gaps with a filler material so as to prevent arcing over the gaps during repair. After the gap(s) have been at least partially filled, the method further includes applying an electrical discharge to the defect.

In another aspect, the present disclosure is directed to a system for preventing damage to one or more components of the gas turbine engine during a repair procedure. The system includes a filler material configured to minimize or eliminate one or more gaps between the one or more components of the gas turbine engine in the vicinity of a defect to be repaired and a repair tool having a working head. The working head is configured to fill the one or more gaps with the filler material and to apply an electrical discharge to the defect. As such, the filler material is configured to prevent arcing over the gaps during application of the electrical discharge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 illustrates a cross-sectional view of one embodiment of a gas turbine engine that may be utilized within an aircraft according to the present disclosure;

FIG. 2 illustrates a partial, cross-sectional view of one embodiment of a turbine suitable for use within the gas turbine engine shown in FIG. 1, particularly illustrating a repair tool of a system configured for providing a filler material to at least partially fill a gap within the gas turbine engine according to the present disclosure;

FIG. 3 illustrates a cross-sectional view of one embodiment of a gap between bearing and the turbine of FIG. 2 along line 3-3, particularly illustrating a conductive medium configured within the gap;

FIG. 4 illustrates a cross-sectional view of another embodiment of a gap between bearing and the turbine of FIG. 2 along line 4-4, particularly illustrating a ground strap configured within the gap;

FIG. 5 illustrates a schematic view of one embodiment of a system for preventing damage to one or more components of the gas turbine engine during a repair procedure according to the present disclosure, particularly illustrating a repair tool of the system providing an electrical discharge to the defect; and FIG. 6 illustrates a flow diagram of one embodiment of a method for preventing damage to one or more components of the gas turbine engine during a repair procedure according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to an improved system and method for preventing damage to one or more components of the gas turbine engine during a repair procedure. More specifically, in one embodiment, the method includes locating one or more gaps of the one or more components of the gas turbine engine in the vicinity of a defect to be repaired. Further, the method includes filling, via a working head of a repair tool, the gap(s) with a filler material so as to prevent arcing over the gaps during the repair procedure. After the gap(s) have been at least partially filled, the method further includes applying an electrical discharge to the defect.

It should be appreciated that the disclosed system and method may generally be used to perform in situ repairs of gas turbine engines, including aircraft-based turbine engines and land-based turbine engines, regardless of the engine's current assembly state (e.g., fully or partially assembled). Additionally, with reference to aircraft engines, it should be appreciated that the present subject matter may be implemented on-wing or off-wing.

Thus, the present disclosure provides many advantages not present in the prior art. For example, when welding or performing other electrical-based repair on-wing, an electrical discharge can damage certain features of the turbine engine, e.g. roller or journal bearings, lab seals, or any other features having gaps between components. As such, the present disclosure permits on-wing electrical discharge by providing a preventive pre-action (i.e. applying the filler material within the gaps near the defect to be repaired) that can easily be washed away or installed in critical and/or remote regions of the turbine engine. Thus, the present disclosure provides a simple repair method, thereby making in situ repairs of turbine blades easy and efficient.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only four of which are shown) defined through the outer casing 18 for providing internal access to one or both of the compressors 22, 24. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor or turbine stage for providing access to the internal components located at such stage(s). In addition, the access ports 62 may also be spaced apart circumferentially around the core engine 14. For instance, a plurality of access ports 62 may be spaced apart circumferentially around each compressor stage.

It should be appreciated that, although the access ports 62 of FIG. 1 are generally described herein with reference to providing internal access to one or both of the compressors 22, 24, the gas turbine engine 10 may include access ports 62 providing access to any suitable internal location of the engine 10, such as by including access ports 62 that provide access within the combustor 26, the turbines 28, 32, and/or any other suitable component of the engine 10.

Referring now to FIG. 2, a partial, cross-sectional view of the low-pressure turbine 32 described above with reference to FIG. 1 is illustrated in accordance with embodiments of the present subject matter. As mentioned, the turbine 32 may include a plurality of turbine stages, with each stage including both an annular array of turbine vanes 33 fixed to a turbine casing 35 and an annular array of rotatable turbine blades 39 that rotate within the casing 35. Further, as shown, the turbine 32 may include one or more bearings 66 configured with the rotatable shaft 45 (which contains the turbine blades 39) of the turbine 32. At the interface of the bearing 66 and the shaft 45, a gap 68 exists to allow the shaft 45 to rotate therein. Such gaps are common throughout the turbine engine 10 and may be located at a plurality of locations, including locations with roller bearings, journal bearings, lap seals, or any other components having close gaps or tight tolerances within the gas turbine engine 10.

When an area within the gas turbine engine 10 or one of the gas turbine components becomes damaged, it is often advantageous to apply heat in the form of electrical discharge to repair the defect and/or defected area. For example, many repairs are made via welding. During a typical welding repair (or any other electrical-based repair procedure), however, electrical discharge may cause damage to various other engine components including but not limited to roller bearings, journal bearings, lap seals, and/or other components having close gaps or tight tolerances within the gas turbine engine 10.

Thus, FIGS. 2-6 illustrate various embodiments and components of a system 100 and method 200 for preventing damage of neighboring components within the gas turbine engine 10 during electrical-based repair procedures, such as welding. Further, it should be understood that the system 100 and method 200 of the present disclosure may be completed while the gas turbine engine 10 is mounted on a wing of an aircraft, as well as off wing.

Referring particularly to FIG. 6, a flow diagram of a method 200 for preventing damage of one or more components of the gas turbine engine 10 during a electrical-based repair procedure is illustrated. As shown at 202, the method 200 includes locating one or more gaps 68 of the one or more components of the gas turbine engine 10 in the vicinity of a defect 72 to be repaired. More specifically, in one embodiment, the method 200 may include inserting an articulating guide 102 into an access port 62 and/or an inlet 52 of the gas turbine engine 10. As shown in FIGS. 2 and 5, the articulating guide 102 includes a proximal end 106 and a distal end 108, with a repair tool 104 configured at the distal end 108 thereof such that the tool 104 can be easily inserted through an access port 62 of the gas turbine engine 10 to allow an in situ repair procedure to be performed therein. Further, the articulating guide 102 as described herein may include any suitable guide or arm configured to fit within various ports 62 and/or the inlet 52 of the engine 10. For example, in one embodiment, the articulating guide 102 may include a snake-arm robot.

As shown at 204, the method 200 includes filling the gaps(s) 68 with a filler material 112 so as to prevent arcing over the gaps 68 during repair. More specifically, as shown in FIG. 2, the system 100 may include a working head 110 configured to fill the gap(s) 68 with the filler material 112. In such embodiments, the working head 110 may include a nozzle, brush, or any other suitable head configured to apply the filler material 112. In the present disclosure, the working head 110 may include various interchangeable heads for making different types of repairs that can be changed according to the desired application. Thus, for the filling application, the working head 110 may be equipped with a filler application component 115. As such, the filler material 112, when applied in the gaps 68, minimizes and/or eliminates the space between components of the gas turbine engine 10 in the vicinity of a defect 72 to be repaired so as to prevent arcing over the gaps 68 during application of the electrical discharge 118, which will be discussed in more detail below. Thus, in certain embodiments, the method 200 may include positioning the working head 110 of the repair tool 104 near the gap(s) 68 and filling the gap(s) 68 via the working head 110 with the filler material 112.

In certain embodiments, as shown in FIGS. 2 and 3, the filler material 112 may include a conductive medium 114. Thus, in one embodiment, the step of filling the gap(s) 68 with the filler material 112 may include coating the one or more components (e.g. the bearing 66) of the gas turbine engine 10 with the conductive medium 114. More specifically, in certain embodiments, the conductive medium 114 may have a viscosity of from about 2000 centipoise (cP) to about 250,000 cP. In such embodiments, the conductive medium 114 has a sticky consistency such that it can be easily applied to the component without leaking to other areas. For example, in certain embodiments, the conductive medium 114 may include a conductive adhesive, an electrode gel, or similar. More specifically, in one embodiment, the conductive medium 114 may include an electrically conductive gel composition such as the composition described in U.S. Pat. No. 5,178,143, entitled "Electrically Conductive Gel Composition," filed on Jul. 24, 1991 and granted on Jan. 12, 1993, which is incorporated herein by reference in its entirety.

Alternatively, as shown in FIG. 4, the filler material 112 may include one or more ground straps 116 configured within the gap(s) 68. For example, as shown, the step of filling the gap(s) 68 with the filler material 112 so as to prevent arcing over the gaps 68 during repair may include mounting or placing one or more ground straps 116 within the gap(s) 68. More specifically, as shown, two ground straps are configured circumferentially around the shaft 45 within the gap 68. As used herein, a ground strap generally refers to an electrical strap with or without grounding hooks that at least partially fills a gap between turbine engine components so as to prevent arcing from electrical discharge from passing therethrough. For example, as shown in FIG. 4, each of the ground straps 116 includes opposing hooks such that the straps 116 can be hooked together at respective ends, thereby holding the straps 116 in place.

After the filler material 112 has been properly replaced within the neighboring gaps 68 of the defects, the method 200 includes applying an electrical discharge 118 to the defect 72 (FIG. 6; step 206), e.g. such as welding. More specifically, as shown in FIG. 5, the method 200 may also include positioning the working head 110 of the repair tool 104 near the defect 72 and applying the electrical discharge 118 to the defect 72 via the working head 110. In such embodiments, the working head 110 may correspond to a welding gun 120. Further, the welding gun 120 may be suitable for a variety of welding applications, including but not limited to arc welding, TIG welding, MIG welding, or similar.

Referring back to FIG. 5, the articulating guide 102 may also include an articulation assembly 122 that allows the orientation of the repair tool 104 to be adjusted within the interior of the gas turbine engine 10. For example, the articulation assembly 122 may allow for the repair tool 104 to be rotated or pivoted about a single axis or multiple axes to adjust the orientation of the repair tool 104 relative to the defect 72 and/or gap(s) 68. It should be appreciated that the articulation assembly 122 may generally have any suitable configuration and/or may include any suitable components that allow for adjustment of the orientation of the repair tool 104. For example, in one embodiment, a plurality of articulation cables may be coupled between the repair tool 104 and one or more articulation motors 124. In such an embodiment, by adjusting the tension of the cables via the motor(s) 124, the repair tool 104 may be reoriented within the gas turbine engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for repairing an engine component, the system comprising:
    the engine component defining one or more gaps; and
    a repair tool comprising a working head, a filler material, and an articulating guide for delivering the filler material through the working head, wherein the filler material comprises a viscosity of greater than 2000 centipoise (cP), the working head positioned within the one or more gaps for filling the one or more gaps with the filler material, wherein the filler material comprises a conductive medium.

2. The system of claim 1, wherein the one or more gaps is in the vicinity of a defect to be repaired.

3. The system of claim 2, wherein the working head is configured to apply an electrical discharge to the defect.

4. The system of claim 3, wherein the filler material is configured to prevent arcing over the one or more gaps during application of the electrical discharge.

5. The system of claim 1, wherein the articulating guide is configured to fit into an access port of the engine component.

6. The system of claim 5, wherein the articulating guide further comprises a proximal end and a distal end, wherein the repair tool is positioned at the distal end.

7. The system of claim 1, wherein the working head comprises a welding gun and a filler application component.

8. The system of claim 1, wherein the conductive medium comprises at least one of a conductive adhesive or an electrode gel.

9. The system of claim 1, wherein the engine component comprises at least one of a turbine blade, a vane, a roller bearing, a journal bearing, or a lap seal.

10. The system of claim 1, wherein the engine component is mounted on a wing of an aircraft during repair.

11. A system for repairing an engine component mounted on a wing of an aircraft, the system comprising:
    the engine component comprising one or more gaps, the one or more gaps in the vicinity of a defect to be repaired; and
    a repair tool comprising a working head, a filler material, and an articulating guide for delivering the filler material through the working head, wherein the working head is configured to at least partially fill the one or more gaps with a filler material, and wherein the filler material comprises a conductive medium with a viscosity of greater than 2000 centipoise (cP), the working head positioned within the one or more gaps for filling the one or more gaps with the filler material.

12. The system of claim 11, wherein the conductive medium comprises at least one of a conductive adhesive or an electrode gel.

13. The system of claim 11, wherein the filler material is configured to prevent arcing over the one or more gaps during application of an electrical discharge to the defect.

* * * * *